US011022114B2

(12) United States Patent
Vermande

(10) Patent No.: US 11,022,114 B2
(45) Date of Patent: Jun. 1, 2021

(54) SCREW PUMP

(71) Applicant: Ratier-Figeac SAS, Figeac (FR)

(72) Inventor: Frédéric Vermande, Figeac (FR)

(73) Assignee: RATIER-FIGEAC SAS, Figeac (FR)

(*) Notice: Subject to any disclaimer, the term of this patent is extended or adjusted under 35 U.S.C. 154(b) by 387 days.

(21) Appl. No.: 15/828,522

(22) Filed: Dec. 1, 2017

(65) Prior Publication Data
US 2018/0156213 A1 Jun. 7, 2018

(30) Foreign Application Priority Data
Dec. 2, 2016 (EP) .................................. 16306606

(51) Int. Cl.
F04C 2/107 (2006.01)
B60T 13/74 (2006.01)
F04C 14/10 (2006.01)
F15B 15/06 (2006.01)
F15B 15/14 (2006.01)
(Continued)

(52) U.S. Cl.
CPC ............ F04C 2/107 (2013.01); B60T 13/745 (2013.01); F04C 14/10 (2013.01); F15B 15/068 (2013.01); F15B 15/1423 (2013.01); F16C 29/06 (2013.01); F16C 33/66 (2013.01)

(58) Field of Classification Search
CPC .. F04C 2/107; F04C 14/10; F04C 2/16; F04C 2/165; F04C 18/16; F04C 18/165; F04C 3/00–3/085; B60T 13/745; F15B 15/068; F15B 15/1423; F16C 29/06; F16C 33/66
See application file for complete search history.

(56) References Cited

U.S. PATENT DOCUMENTS 1,306,572 A * 6/1919 Bartlett ................. F04C 18/107
418/220
2,403,092 A * 7/1946 Lear ......................... B64C 25/24
74/89.26
(Continued)

FOREIGN PATENT DOCUMENTS

CH 332956 A 9/1958
DE 4010260 A1 11/1990
(Continued)

OTHER PUBLICATIONS

Full Machine Translation of German Patent DE 4010260 A1 to Nossen.*
(Continued)

Primary Examiner — Peter J Bertheaud
Assistant Examiner — Dnyanesh G Kasture
(74) Attorney, Agent, or Firm — Cantor Colburn LLP

(57) ABSTRACT

A screw pump comprises a body which has a cylindrical duct formed therein. A screw shaft is located in the cylindrical duct and is arranged to transport liquid between an inlet and an outlet of the screw pump. The screw shaft has a screw thread which defines a helical liquid path within the cylindrical duct. The body of the screw pump includes a groove extending along an inside surface of the cylindrical duct, the groove defining, in part, a ball-passage which extends alongside the screw shaft and intersects with the helical liquid path. The ball-passage contains a plurality of balls which are guided along the ball-passage by the screw thread when the screw shaft rotates relative to the body.

10 Claims, 4 Drawing Sheets

(51) Int. Cl.
*F16C 29/06* (2006.01)
*F16C 33/66* (2006.01)

(56) References Cited

U.S. PATENT DOCUMENTS

| | | | | |
|---|---|---|---|---|
| 2,577,361 A * | 12/1951 | Pool | ............ | F04C 3/02 |
| | | | | 418/220 |
| 2,583,583 A * | 1/1952 | Mangan | ............ | F04B 39/0246 |
| | | | | 417/372 |
| 3,775,041 A * | 11/1973 | Buttner | ............ | F26B 3/205 |
| | | | | 432/27 |
| 4,202,526 A * | 5/1980 | Muller | ............ | F16K 47/023 |
| | | | | 137/512.15 |
| 6,079,797 A | 6/2000 | Ganzel | | |
| 7,435,000 B2 | 10/2008 | Neufang et al. | | |
| 2002/0084118 A1 * | 7/2002 | Esaki | ............ | B60W 10/26 |
| | | | | 180/65.25 |
| 2002/0173895 A1 * | 11/2002 | Kitaori | ............ | B60K 6/48 |
| | | | | 701/51 |
| 2003/0106386 A1 * | 6/2003 | Pacieri | ............ | F16C 19/20 |
| | | | | 74/424.82 |
| 2004/0027012 A1 * | 2/2004 | Sangha | ............ | H02K 9/197 |
| | | | | 310/58 |
| 2005/0123663 A1 * | 6/2005 | White | ............ | A21C 9/04 |
| | | | | 426/518 |
| 2007/0068291 A1 * | 3/2007 | Beatty | ............ | H02K 7/06 |
| | | | | 74/89.26 |
| 2012/0060485 A1 * | 3/2012 | Yamada | ............ | F16H 61/66272 |
| | | | | 60/436 |
| 2014/0129066 A1 * | 5/2014 | Inoue | ............ | B60W 30/186 |
| | | | | 701/22 |
| 2014/0138451 A1 * | 5/2014 | Pham | ............ | F04B 39/128 |
| | | | | 237/12 |
| 2015/0354697 A1 * | 12/2015 | Kinch | ............ | F16H 61/0025 |
| | | | | 74/473.11 |
| 2015/0377261 A1 | 12/2015 | Weh et al. | | |
| 2016/0340026 A1 * | 11/2016 | Antunes | ............ | F16H 25/205 |

FOREIGN PATENT DOCUMENTS

| | | |
|---|---|---|
| JP | 2002089653 A | 3/2002 |
| JP | 2005299923 A | 10/2005 |
| JP | 2013061067 A | 4/2013 |

OTHER PUBLICATIONS

Full Machine Translation of Swiss Patent CH 332956 A to Affolter.*
Extended European Search Report for International Application No. 16306606.1 dated Feb. 16, 2017, 7 pages.

* cited by examiner

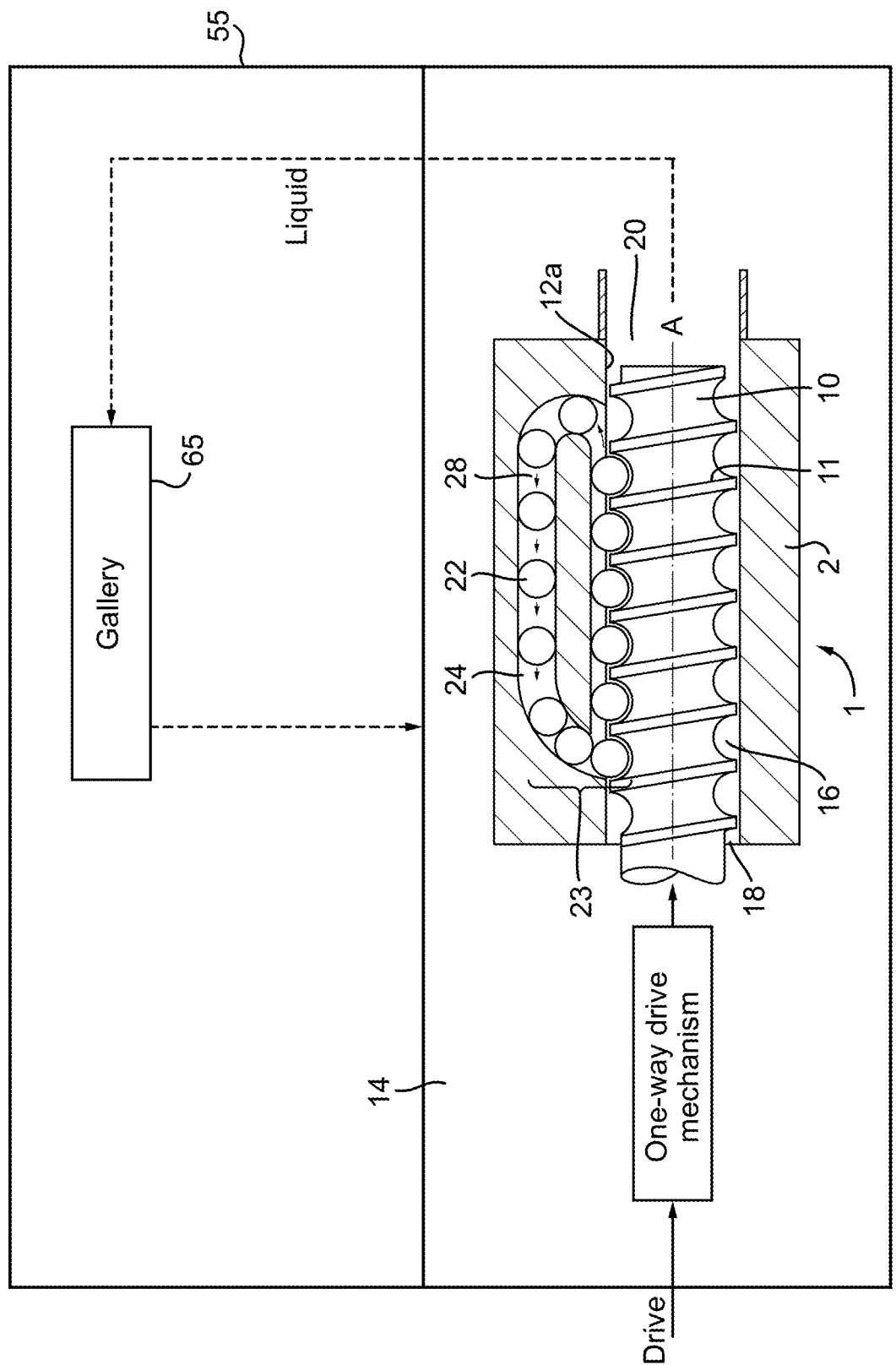

SCREW PUMP

FOREIGN PRIORITY

This application claims priority to European Patent Application No. 16306606.1 filed Dec. 2, 2016, the entire contents of which is incorporated herein by reference.

TECHNICAL FIELD

The present disclosure relates to a screw pump which is arranged to transport a liquid. It also relates to a liquid recirculation system comprising the screw pump. The liquid recirculation system may be part of an actuator, for example, an actuator for a flight control surface.

BACKGROUND

It is known to provide pumps of various forms to deliver liquids, such as a lubricant or coolant, from a sump to an upper region of a hydraulic gallery so that it can be used to lubricate moving parts or to cool regions of a device, for example, in an actuator in an aircraft.

It is known in the automotive industry to use chains and/or cogs in order to lift lubricant from a sump to a point where it can enter a lubricant gallery.

It is desirable to provide an alternative mechanism suitable for transporting a liquid for use in a flight control actuator of an aircraft.

SUMMARY

According to the present disclosure a screw pump is described which is able to transport a liquid, e.g., a lubricant or a coolant. The screw pump comprises a body which has a cylindrical duct formed therein. A screw shaft is located in the cylindrical duct and is arranged to transport liquid between an inlet and an outlet of the screw pump. The screw shaft has a screw thread which defines a helical liquid path within the cylindrical duct. The body of the screw pump includes a groove extending along an inside surface of the cylindrical duct, the groove defining, in part, a ball-passage which extends alongside the screw shaft and intersects with the helical liquid path. The ball-passage contains a plurality of balls which are guided along the ball-passage by the screw thread when the screw shaft rotates relative to the body.

The helical liquid path may be bounded by adjacent turns (or at least crests) of the screw thread and by the inside surface of the cylindrical duct.

The balls may divide the helical liquid path into a plurality of helical volumes. The balls may act as valves to retard flow of the liquid between adjacent helical volumes. That is, the balls act to retain fluid within each helical volume.

Each helical volume may be bounded by a ball at each end which is adjacent to the next in the ball-passage in an axial direction. The balls may provide a sealing function for each helical volume, at least within the realms of the sealing capability of the screw pump, to maintain the liquid within the helical volumes for as long as possible. The balls may have some resilience/compliance and/or the balls may be only marginally smaller than the ball-passage, to achieve a better seal. The helical volumes, with the balls acting as dividers, allow liquid to be syphoned along by the seal of the balls at a leading end of the helical volumes (through the creation of a low pressure behind the ball), and simultaneously for liquid to be pushed along by the ball at a trailing end of the helical volume, as the plurality of balls move along the ball-passage.

The balls may divide the helical liquid path at consecutive turns of the screw thread, such that the helical volumes each correspond to a single-turn.

The ball-passage may be straight when viewed side on. For example, the groove may extend substantially parallel to an axial direction of the screw shaft. The groove may extend in a substantially vertical direction.

A return ball-passage, which connects a first end of the ball-passage with a second end of the ball-passage, may be provided within the body of the screw pump. The return ball-passage may for example be provided by a bore within the pump body.

The ball-passage and the plurality of balls contained therein may form a part of a ball-loop, and the screw pump may comprise a plurality of ball-loops, to provide redundancy. The screw pump may comprise two or three ball-loops.

The (or each) ball-loop may comprise a return ball-passage connecting a first end of the (respective) ball-passage with a second end of the (respective) ball-passage. The return ball-passage(s) may be substantially parallel to the (respective) ball-passage(s).

The ball-passage may extend at least between the inlet and the outlet of the screw pump.

The transportation of the liquid may comprise lifting the liquid between the inlet and the outlet. In one example, a lower end of the ball-passage, where the balls are brought into engagement with the screw shaft, may be positioned below a level of the inlet and an upper end of the ball-passage, where the balls are deflected from the screw shaft, may be positioned above a level of the outlet. The screw shaft may be inclined or upright within the pump. The ball-passage may be configured so that the screw shaft lifts balls which have passed through the liquid when the screw shaft rotates in a transporting direction.

Alternatively, the screw shaft may be horizontal. The screw shaft may transport liquid between an inlet and an an outlet which correspond to where the liquid is drawn into the helical liquid path of the screw shaft and where it is pumped out of the helical liquid path.

The screw thread may have a profile which is matched to the balls. For example, the screw thread may comprise a semi-circular profile substantially corresponding to an outer surface profile of the balls. The spacing between adjacent threads of the screw shaft in the ball-passage may correspond substantially to the diameter of the balls.

The balls may be within 10% of the same size. The balls may have a size matched to the profile of a ball-screw screw thread of the screw shaft. The balls may comprise a hard-wearing material like a metal material or a ceramic material. The balls may also comprise a material which is fracturable or shearable by the screw thread in the event of a jam. For example, the balls may comprise a (tough) plastic material, or may comprise a metal or ceramic material that will fail in preference to the screw shaft. The balls may comprise a plastic material with a harder-wearing coating to resist wear, for example, a metal coating or a ceramic coating. The balls may be resilient, or may comprise a resilient surface coating.

The body may be a multipart body, and the ball-passage may be provided, in part, by two tracks, each formed in an opposite face of the multipart body.

The screw pump may be coupled with a sump and a gallery and may transport the liquid around a recirculation system comprising the sump and the gallery.

Thus the present disclosure can also be seen to provide a liquid recirculation system comprising: a screw pump as described in any of the statements above; a sump containing a liquid; and a gallery. The screw shaft may extend into the liquid to lift it up from a level of the sump to an upper level of the gallery. The gallery may be arranged to return liquid back to the sump.

The recirculation system may be arranged to receive drive from a motor or gearbox of an actuator.

The recirculation system may comprise a one-way drive mechanism arranged to provide drive to the screw shaft in a transporting direction only. The one-way drive mechanism may comprise a one-way clutch (for example a free-wheel). The one-way drive mechanism may comprise a two-way clutch. Such a two-way clutch may comprise a first clutch (for example a first free-wheel) and a second clutch (for example a second free-wheel). The first clutch may be driven by a gear, and the second clutch may be driven indirectly by the same gear, for example, via an idler gear interposed between the gear and the second clutch.

The present disclosure can also be seen to provide an actuator comprising a recirculation system as described in one of the statements above. The actuator may be a flight control surface actuator. For example, the actuator may be a trimmable horizontal stabilisation actuator (THSA). The gallery may be arranged to lubricate or cool moving parts of the actuator.

The present disclosure can also be seen to provide a method of transporting liquid (for example, a lubricant or a coolant) between an inlet and an outlet of a screw pump. The screw pump comprises a body having a cylindrical duct formed therein. A screw shaft is located in the cylindrical duct and is able to rotate about an axis. The screw shaft has a screw thread defining a helical liquid path within the cylindrical duct. The body of the screw pump includes a groove extending along an inside surface of the cylindrical duct, the groove defining, in part, a ball-passage which extends alongside the screw shaft and intersects with the helical liquid path. A plurality of balls are guided by the screw thread along the ball-passage, by rotating the screw shaft relative to the body.

The balls may divide the helical liquid path into a plurality of helical volumes, and the balls may act as valves to retard flow of the liquid between adjacent helical volumes. That is, the balls act to retain fluid within each helical volume when the screw shaft is stationary.

In the method, the balls may be guided out of the screw shaft at a first end of the ball-passage and allowed to return via a return ball-passage to a second end of the ball-passage where the balls, having been passed through the liquid, are transported again by the rotating screw shaft. The balls may return under gravity, or may be pushed along by other balls.

The present disclosure may also be seen to provide a method of making a screw pump for transporting a liquid, for example a lubricant or a coolant. In an embodiment where the pump comprises a multi-part, e.g., a two-part body, each body part may comprise recesses formed in a face of each body part, that when brought together provide: a cylindrical duct for receiving a screw shaft; an inlet and an outlet arranged on one side of the cylindrical duct; and a loop-shaped passage on the other side of the cylindrical duct. The loop-shaped passage comprises a ball-passage and a return ball-passage, the ball-passage being defined by a groove extending along an inside surface of the cylindrical duct. The method comprises: placing a first of the body parts with its recess for the cylindrical duct arranged around a region of the screw shaft; placing a plurality of balls in the recess for the loop-shaped passage; and mounting the second body part to the first body part in a face-to-face manner to form the screw pump.

BRIEF DESCRIPTION OF THE FIGURES

Certain exemplary embodiments of the present disclosure will now be described in greater detail by way of example only and with reference to the accompanying drawings, in which:

FIG. 5 is a schematic axial cross-sectional view illustrating another exemplary screw pump mounted in a horizontal position within a gearbox.

DETAILED DESCRIPTION

Figure 1:
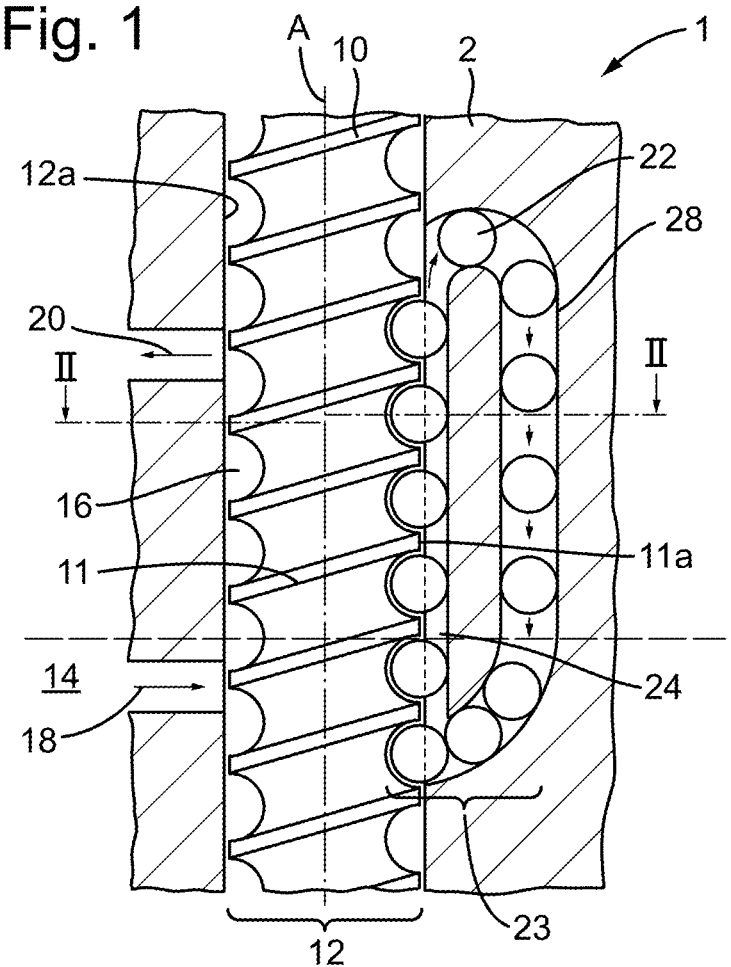
FIG. 1 is a schematic axial cross-sectional view illustrating an exemplary screw pump which is able to transport a liquid between levels.

FIG. 1 illustrates an exemplary screw pump which is able to transport a liquid. In this example the liquid is a lubricant or coolant for lubricating or cooling a drive or transmission device such as a motor or gearbox. In this example the screw pump comprises a substantially upright screw shaft configured to lift liquid between a lower level and an upper level of the screw pump, but the present disclosure extends to other arrangements where the screw shaft is inclined or may even be arranged substantially horizontally (as shown in FIG. 5).

The figure shows a screw pump 1 comprising a body 2 which defines a cylindrical duct 12 within which is fitted a screw shaft 10. Around the screw shaft 10 is a screw thread 11, the outermost edge 11a of which is very close to the inside surface 12a of the duct 12 such that the screw shaft 10 fits tightly within the duct 12. The tolerances are such that any liquid being carried by the screw shaft 10 may drain back only slowly towards a sump 14 around this outermost edge 11a.

The screw thread 11 may have a profile which substantially conforms to an outer surface of a ball (the balls 22 will be described in more detail below). For example, the screw shaft 10 may comprise a ball-screw screw thread 11. The screw thread 11 may have a semi-circular profile which substantially matches an outer surface of a ball 22.

A helical liquid path 16 for the liquid may be provided, which is bounded by adjacent turns of the screw thread 11 and by the inside surface 12a of the cylindrical duct 12.

A lowermost portion of the screw shaft 10 may be positioned within the cylindrical duct 12, as shown, so as to be below the level of a sump 14. The sump 14 may be in fluid communication with the cylindrical duct 12 and with the helical liquid path 16 via an inlet 18. The inlet 18 is also below the level of the sump 14 to allow the liquid to enter the helical liquid path 16.

Above the level of the inlet 18 and the sump 14 is an outlet 20 which is in fluid communication with the cylindrical duct 12 and the helical liquid path 16. The outlet 20 is in fluid communication with an upper region of a gallery 65 (see FIGS. 3 to 5) for onward distribution of the liquid.

A screw pump with only these features is capable of lifting liquid from a level of the sump 14 to an upper level within the gallery 65 via the inlet 18, helical liquid path 16 and outlet 20. This is achieved as follows. Fluid from the sump 14 is drawn into the helical liquid path 16 as the screw shaft 10 rotates within the cylindrical duct 12. The screw shaft 10 rotates but does not move vertically with respect to the cylindrical duct 12. The screw pump is arranged in a substantially vertical direction to lift liquid from the inlet level 18 up to the outlet level 20 of the screw pump. When the screw shaft 10 ceases to rotate within the cylindrical duct 12, liquid is no longer drawn into the helical liquid path 16. Any liquid held in the helical liquid path 16 is able to drain back down through the helical liquid path 16 towards the sump 14.

The modification here is to provide a ball-loop 23, part of which intersects with the helical liquid path 16. The ball-loop 23 comprises a ball-passage 24, a return ball-passage 28 and a series of balls 22 which are able to move around the ball-passage 24 and return ball-passage 28. The ball-passage 24 is the portion of the ball-loop 23 that intersects the helical liquid path 16. The ball-passage 24 is delimited by the inner extremity of the helical liquid path 16 as provided by the surface of the screw shaft 10, and a groove 26 extending up the inside surface 12a of the cylindrical duct 12, which may be substantially parallel to the screw shaft 10 as shown. That is, the helical liquid path 16 and ball-loop 23 are conjoined along the extent of this ball-passage 24, and in this part, the screw shaft 10 provides one side of the ball-passage and the groove 26 provides an opposite side of the ball-passage. The cross-sectional profile of the groove 26 may be substantially arcuate and in particular, may be semi-circular and may correspond substantially to the outer surface profile of the balls disposed within the ball-passage. The groove 26 may extend substantially parallel to an axial direction of the screw shaft 10. The groove may also be straight.

At the top of this region of intersection of the ball-passage 24 with the helical liquid path 16, the balls 22 are diverted into a return ball-passage 28 (part of the ball-loop 23) which allows the balls 22 to return to a point where they enter into the bottom of the ball-passage 24 to be lifted once again. Each ball 22 may drop through the return ball-passage 28 under gravity, or it may be pushed down through the return ball-passage 28 by other balls 22 entering into the return ball-passage 28 above it.

The balls 22, ball-passage 24 and return ball-passage 28 may be sized such that the balls 22 fit snugly within the ball-passage 24 and return ball-passage 28. The balls 22 may also correspond to the profile of the screw thread 11 of the screw shaft 10 so that they have an effect of blocking the helical liquid path 16. The balls 22 in effect may divide the helical liquid path 16 into a plurality of helical volumes. The balls 22 are also able to seal each helical volume, helping to maintain liquid within the helical volumes even when the screw shaft 10 is stationary. In the present example, each turn of the helical liquid path 16 corresponds to one of the helical volumes, each being bounded at either end by a ball 22. The numbers of ball-loops 23 and number of threads 11 on the screw shaft 10 can be adjusted to create different helical volumes. In the illustrated embodiment, the balls 22 are arranged vertically adjacent to one another in this ball-passage 24.

Some of the liquid may be syphoned up through the movement of a ball 22 being lifted up via the rotation of the screw shaft 10, some may cling to the ball 22 and some may be pushed up ahead of the ball 22. As a result the liquid flows up through the screw pump 1 via the rising helical liquid path 16, the liquid being drawn up by the motion of the screw thread 11 and the balls 22 relative to the liquid in the sump 14, and fed out of the outlet 20.

The balls 22 can be seen to act as valves, keeping the volume of liquid between each ball 22 (i.e. a helical volume of liquid) in place, at least within the limits of the sealing tolerances of the screw pump, even when the screw shaft 10 stops rotating. This slows the rate of the liquid leaking down towards the sump 14 via the helical liquid path 16 when the screw shaft 10 is stationary and may prevent it or substantially prevent it.

The balls 22, guided by the groove 26, follow a vertical path in an axial direction of the screw shaft 10 as they are lifted upwards by the rising level of the screw thread 11 on which they rest.

The dimensions of the pitch of the thread 11 and the major diameter of the screw shaft 10 may be chosen so that the incline of the thread 11 with respect to an axis A of the screw shaft 10 (helix angle) is less than 30°, less than 20°, or more usually, less than 15° or less than 10°. Thus the thread 11 may have a reasonably shallow helix angle to reduce the return of liquid back to the sump 14 when the screw pump is idle.

In the illustration shown, the screw shaft 10 has a single thread 11 providing a helical liquid path 16 around the screw shaft 10. The screw shaft 10 could also comprise multiple threads if desired but this would also increase the helix angle for a given diameter of ball 22. In the case of multiple threads, adjacent balls 22 may divide different helical liquid paths separated by a crest of the screw thread into a plurality of helical volumes.

The duct 12 may be formed in a body 2, such as a housing or casing. The body 2 may comprise a multi-part body, e.g., a two part body, each part of which has been formed with a recess that aligns with its counterpart body to form the cylindrical duct 12, as well as the inlet 18 and the outlet 20 for the liquid and other passageways. There may of course be more than one inlet 18 feeding liquid into the screw pump 1 and more than one outlet 20 receiving liquid from the screw pump 1, for example serving different galleries.

When the screw shaft 10 is stationary, the liquid will want to drain towards the sump 14. The level of the liquid in the sump 14, would usually be higher than the inlet 18, and this provides a sump level (e.g. the manufacturer's fill level for the lubricant or coolant).

The outlet 20 takes off the liquid that has been lifted by the screw pump 1 and provides an outlet level for the screw pump 1.

The body 2 may provide a housing of the screw pump 1. The body 2 may be part of the device for which it is intended to distribute liquid in, or it may affix to such a device as a separate component. For example, it may comprise part of or be a component for an actuator 40 for a flight control surface of an aircraft, for lifting lubricant or a coolant in that actuator.

An inlet conduit to the inlet 18 and an outlet conduit from the outlet 20 may be disposed on one side of the body 2, e.g., to supply liquid to a gallery 65 of liquid passages for feeding lubricant or coolant to the device. Arranging them on the same side of the screw shaft axis A (when viewed in cross-section as shown in FIG. 1) can make it easier to form the body 2 in two halves.

The ball-loop 23 is disposed in the body 2. The ball-loop 23 comprises a loop-shaped track or passage that guides the path of a plurality of balls 22 in a loop. The shape of the loop may be substantially stadium shaped and lie in a plane where two parts of the body join, but its actual shape is not critical to its operation. The purpose of the loop is to guide the balls 22 as they are lifted from a low position to a high position and to guide their return back to the low position.

The ball-loop 23 may be disposed in the body 2 on a side opposite to that of the inlet 18 and outlet 20 and associated conduits. In this way a multi-part body may be formed, e.g., by casting or forging, with one half of a loop of the ball-loop 23 provided by a groove 26 in each of the opposed parts. The return ball-passage 28 may be formed in the body 2 or may be a separate component such as a pipe connected to the body 2.

A lower end of the ball-passage 24 may intersect the helical liquid path 16 at a point below the sump level 14 so that the balls 22 are fully immersed in and are passed through the liquid before they are lifted up. The lowest point of the entry into this region for the balls 22 may be substantially a ball diameter below the sump level so that the lowest ball is fully immersed when the screw pump is at rest and the liquid has drained back into the sump 14. The lowest point may of course be located lower still.

A lower end of the ball-passage 24 may be configured to guide the balls 22 into contact with the screw thread 11 of the screw shaft 10. An upper end of the ball-passage 24 may be configured to guide the balls 22 away from the screw thread 11 and into the return ball-passage 28 of the ball-loop 23 for feeding back into the ball-passage 24.

The ball-loop 23 comprises a plurality of balls 22. It may comprise a substantially continuous string of balls, for example (the arrangement shown in the figure is schematic). Some spaces may be present between the balls, e.g., as the thread 11 passes between them in the ball-passage 24, and as they return to a lower end of the return ball-passage 28 of the ball-passage 23 for re-introduction into the screw thread 11.

The balls 22 disposed within the ball-loop 23 may be of the same size and may comprise a hard material like a metal or ceramic. In one example, the balls 22 comprise stainless steel ball bearings. As the balls 22 are not being used to provide a bearing function, the balls 22 may instead comprise a softer material such as a tough plastic (though they should have reasonable wear resistance), which is able to fracture or shear in the event of a jam, and may even comprise a material which is slightly compliant/resilient to assist formation of a seal with the screw thread and the edge of the vertical groove 26. The balls 22 may even be made entirely from a resilient material, or may comprise a resilient outer coating over a non-resilient core. Use of plastic balls may reduce the possibility that the screw shaft 10 is prevented from rotating if the screw pump fails due to one of the balls 22 becoming jammed in the ball-loop 23. A plastic ball 22 may simply shear or otherwise fragment if it becomes jammed within the ball-loop 23, thereby avoiding damage to other parts of the screw pump 1. It may be provided with a coating, for example, a metallic or ceramic coating to help its wear properties.

Figure 2:
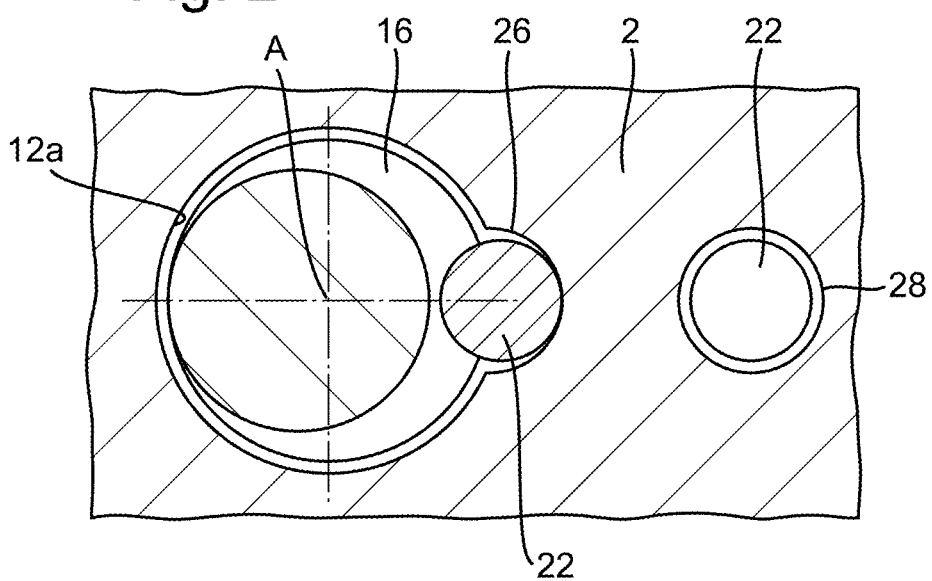
FIG. 2 is a schematic cross-sectional view along the line II-II in FIG. 1.

FIG. 2 depicts a cross sectional view of the screw pump through line II-II of FIG. 1. It can be seen from FIG. 2 that the major diameter of the screw shaft 10 is sized to fit snuggly within the circular opening of the cylindrical duct 12. Between the lower and upper points of intersection of the ball-loop 23 with the helical liquid path 16, a groove 26 extends up the inside surface 12a of the cylindrical duct 12.

Figure 3:
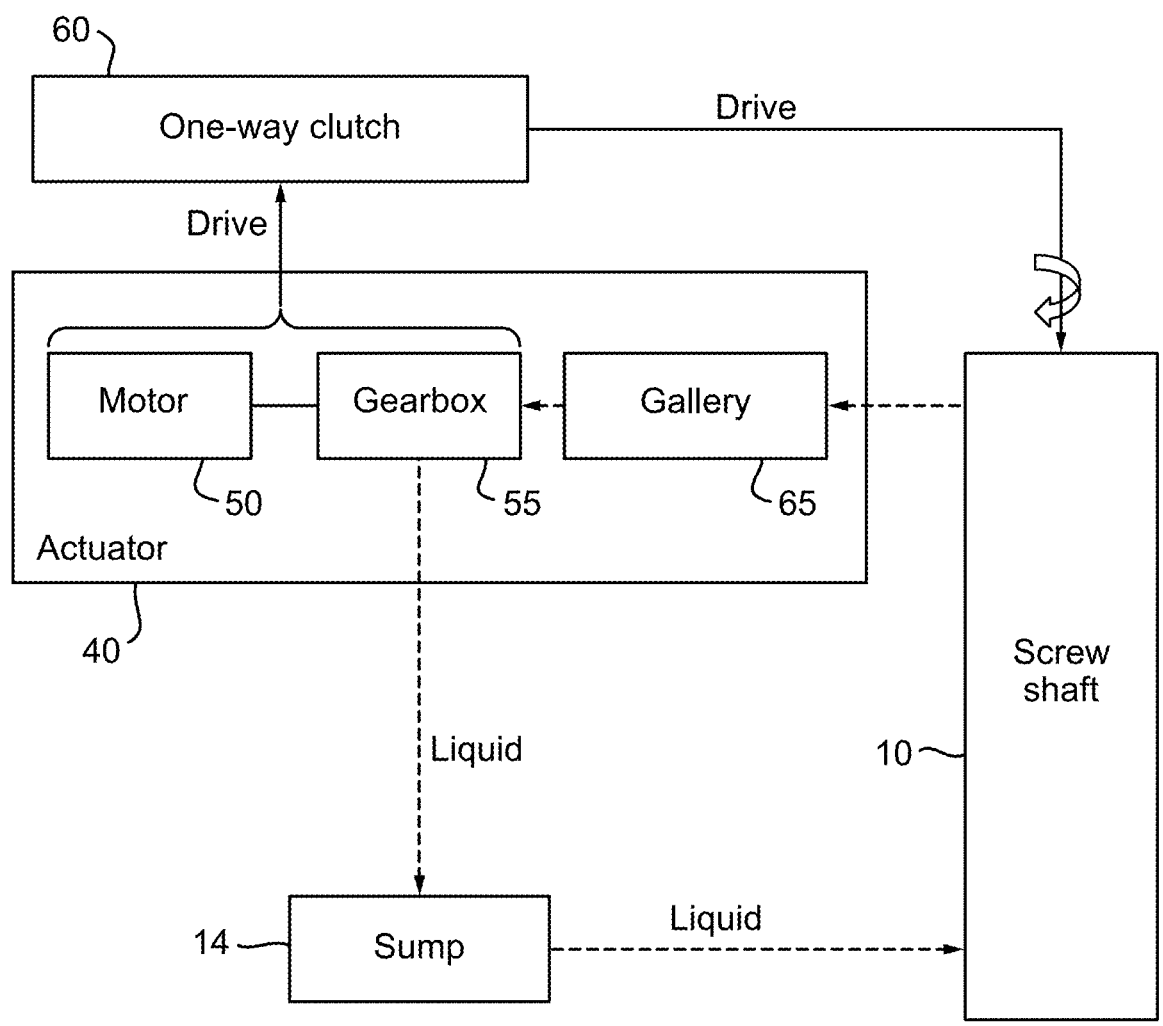
FIG. 3 is a schematic representation of a drive system for the screw pump.
Figure 4:
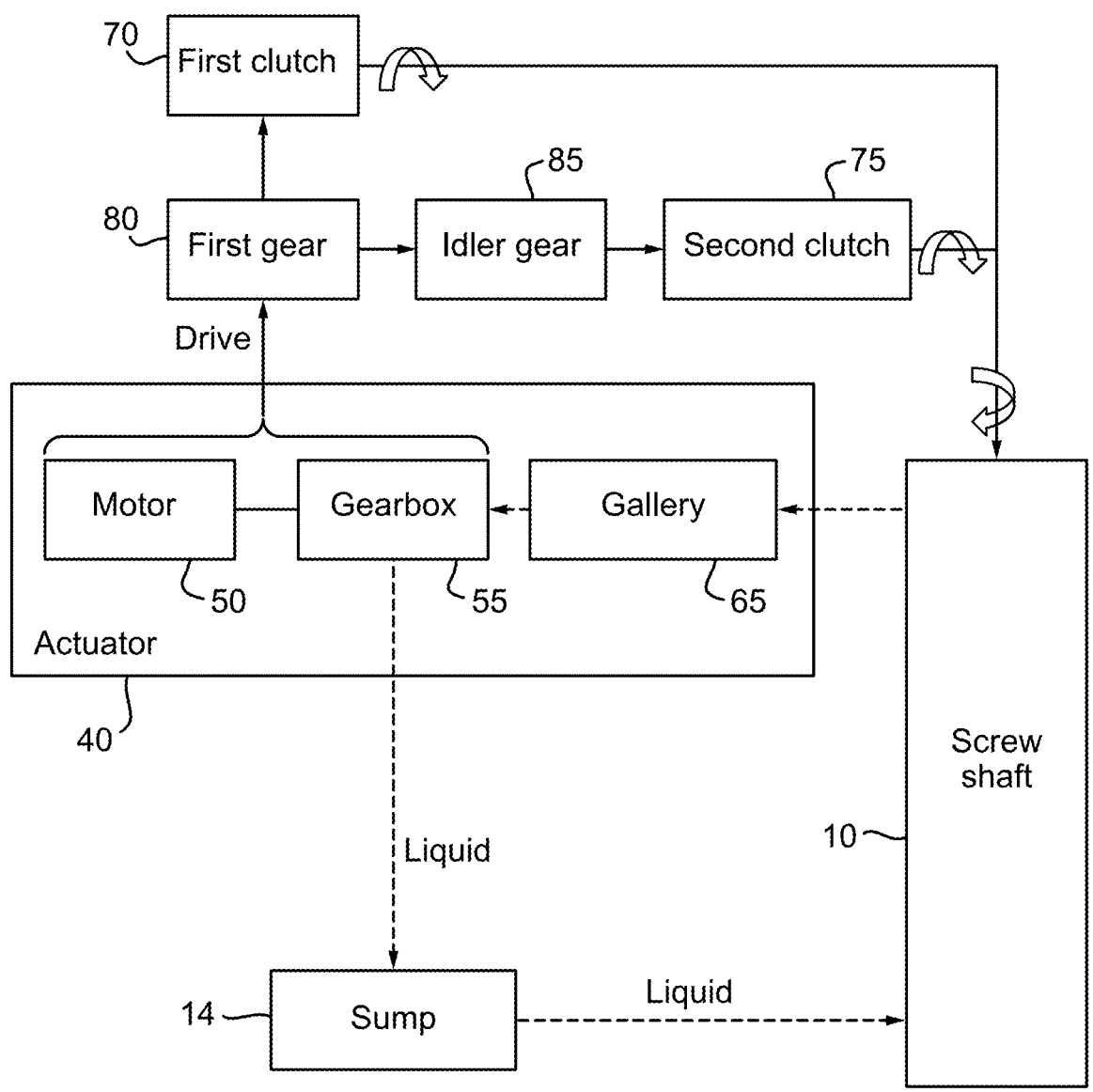
FIG. 4 is a schematic representation of another drive system for the screw pump.

As shown in FIGS. 3 and 4, external to the screw pump, a motor 50 and/or gearbox 55 of an actuator 40 may be arranged to provide drive for the screw shaft 10. The screw pump may be coupled by gears (see FIG. 4) or a belt to receive drive. The actuator 40 for a flight control surface, for example, necessarily has to move in both directions during use, but only one of these directions of motion will turn the screw shaft 10 in the correct direction if the actuator and screw pump are directly connected. Therefore, a one-way drive mechanism 58 may be provided to receive drive from the motor 50 or gearbox 55 and output it in one direction only.

The one-way drive mechanism 58 may comprise a one-way clutch 60 (for example, a single free-wheel) which only transmits drive provided in one direction, and may only provide drive for half of a duty cycle. In an alternative embodiment, which is shown in FIG. 4, the one-way drive mechanism instead comprises a two-way clutch arrangement (for example, two freewheels arranged in opposite directions) which transmits drive to the screw shaft 10 when drive is received in either direction, so that both halves of the duty cycle are used to drive the screw pump, the direction of the drive being reversed for one of the directions. The two-way clutch may comprise a first clutch 70 (for example a first free-wheel) and a second clutch 75 (for example a second free-wheel). The first clutch 70 may be driven by a first gear 80, and the second clutch 75 may be driven by the first gear 80 via an idler gear 85 interposed between the first gear 80 and the second clutch 75. The drive output direction from the idler gear 85 may thus be reversed compared to the drive output direction from the first gear 80, so that the screw shaft 10 of the screw pump is always driven in the same direction.

Use of such mechanisms avoids the screw shaft 10 being driven in the wrong direction (a non-lifting direction) by the actuator 40.

Thus the one-way drive mechanism 58 may be disposed so as to provide drive to the screw shaft 10 in a direction such that liquid is lifted only (a lifting direction). The balls 22 enter the ball-passage 24 at a lower point of the screw pump 1 and are lifted by the rotating thread 11 of the screw shaft 10 from an inlet level 18 (or below) up to the outlet level 20 (or higher), together with the liquid, in a similar fashion to the way water can be lifted by an Archimedes Screw.

During operation, the screw thread 11 together with the balls 22 is able to lift liquid, which might be a lubricant or a coolant, from the sump 14 up to the level of the outlet 20 and into the associated gallery 65. The liquid is lifted without the need to pressurise the liquid. The mechanism is mechanically simple, lightweight and robust.

When the screw pump is paused, the balls 22 rest against the groove 26 and part of the screw thread 11 in a manner similar to a valve. In this way, the balls 22 can provide a sealing function and hold the liquid within the helical liquid path 16, or at least reduce the rate at which the liquid can drain back towards the sump.

FIG. 5 is an alternative embodiment and shows a housing for a gearbox 55, at the bottom of which is provided a sump 14 holding lubricant (in this example). The screw pump 1 (which has the same features as those described in relation to FIG. 1) is mounted such that the screw shaft 10 is horizontal. The screw shaft 10 is driven via a one-way drive mechanism 58 which receives drive from within the gearbox 55 (not shown) or from outside of the gearbox (as shown). The screw pump 1 acts as a constant displacement pump to push liquid from the sump 14 to a gallery 65 which can then provide lubricant to components within the gearbox 55. The seals provided by the balls 22 prevent the lubricant downstream of the pump 1 from falling back into the sump 14 under the pressure of the upstream lubricant when the screw pump 1 is stopped, and so avoids starving the lubricant circuit.

Prior to take off, a pilot will undertake a number of pre-flight checks. This includes moving the flight control surface actuators 40 through a full range of movement in one direction and then back again. In doing this, even if the actuator 40 has not been used for a long time and the lubricant has substantially drained from the contact surfaces, then the significant displacement of the actuator 40 during the pre-flight check may ensure that a quantity of lubricant is transported by the screw pump 1 (regardless of its orientation) from the sump 14 up to the gallery 65 for use during the flight. Also when a lubricant is cold it tends to be more viscous and so larger quantities of lubricant may be transported during such initial pre-flight checks than compared to later movements when the lubricant has become warmed by the actuator.

During a flight, an actuator 40 for a flight control surface may not be moved for protracted periods of time. The arrangement of the balls 22 in the ball-passage 24 can assist to retain pools of lubricant/coolant within the screw pump 1 (within the helical volumes), so that when there is drive again, the coolant/lubricant is held part way up the screw pump 1 so that smaller amounts of drive are required to lift the coolant/lubricant to the outlet 20 when the drive resumes.

Also for an actuator 40 of a flight control surface, for every moment in one direction, there will usually be an equal and opposite moment in the other direction shortly afterwards. Accordingly, if the one-way drive mechanism (for example one-way clutch 60) only transmits drive during one direction of a movement cycle, then a reasonable amount of lubricant/coolant can still be lifted up to a gallery 65.

An advantage of the present disclosure is that the screw pump may be more efficient compared to a conventional pump, as friction is reduced because there are fewer surfaces in sliding contact with each other. Additionally, the system may not require the screw pump to be driven at a high torque (as might otherwise be required to lift cold, viscous liquid, such as lubricant in an aircraft, under pre-flight conditions). A further advantage is that the screw pump can be relatively lightweight. The balls 22 replace material of the body 2, and the amount of lubricant or coolant that is held in the sump 14 may be reduced through the quantity of lubricant/coolant that can be held close to the level of the outlet in the screw pump 1. This leads to weight-savings, which of course is beneficial in terms of efficiency and fuel-savings.

Thus, according to the present disclosure, at least in the illustrated examples, there can be seen to be provided a recirculation system for a mechanical transmission system such as a gearbox, a motor, a driveshaft or any other actuator part requiring lubricant or heat dissipation. For example, there is disclosed an oil recirculation system in which a feeding screw shaft brings the liquid from the bottom of a gear box/transmission casing up to the top. The feeding screw, which is part of a screw pump, is meshed/linked to an associated actuator, such that the screw shaft turns when the actuator moves. This basic system is improved by implementing a valve function, avoiding the fluid draining to the bottom of the gear box/transmission casing when the screw shaft stops rotating. This function is provided by a ball recirculation system allowing each thread of the screw shaft to be sealed by one ball, to allow the liquid to be kept in place, thereby improving the efficiency of the device. Each ball may travel upwards guided by a vertical groove tangential to the rotational movement of the screw shaft. When each ball arrives at the end of the screw shaft (on top), they can recirculate by gravity through another vertical and parallel groove to come down to the bottom of the screw shaft. The ball may then re-engage the screw thread, thereby trapping a volume of fluid on one turn of thread that will be brought up.

The invention claimed is:

1. A liquid recirculation system comprising:
a sump containing a liquid lubricant or liquid coolant;
a gallery; and
a screw pump comprising a body having a cylindrical duct formed therein, and a screw shaft located in the cylindrical duct arranged to transport liquid between an inlet and an outlet of the screw pump, the screw shaft having a screw thread defining a helical liquid path within the cylindrical duct,
wherein the body of the screw pump includes a groove extending along an inside surface of the cylindrical duct, the groove defining in part a ball-passage extending alongside the screw shaft and intersecting with the helical liquid path, the ball-passage containing a plurality of balls which are guided along the ball-passage by the screw thread when the screw shaft rotates relative to the body, wherein the screw pump is coupled with the sump and the gallery, the screw pump being arranged to transport the liquid around the recirculation system,
wherein the screw shaft extends into the liquid lubricant or liquid coolant to lift it up from a level of the sump to an upper level of the gallery, and the gallery is arranged to return liquid back to the sump, wherein the recirculation system is arranged to receive drive from a motor or gearbox of a flight control surface actuator,
and wherein the recirculation system comprises a one-way drive mechanism arranged to provide drive to the screw shaft in a transporting direction only.

2. A screw pump as claimed in claim 1, wherein the balls divide the helical liquid path into a plurality of helical volumes, and wherein the balls act as valves to retard flow of the liquid between adjacent helical volumes.

3. A screw pump as claimed in claim 1, wherein the groove extends substantially parallel to an axial direction of the screw shaft,
and/or wherein a return ball-passage, which connects a first end of the ball-passage with a second end of the ball-passage, is provided within the body of the screw pump.

4. A screw pump as claimed in claim 1, wherein the ball-passage extends at least between the inlet and the outlet, and wherein the transportation of the liquid comprises lifting the liquid between the inlet and the outlet.

5. A screw pump as claimed in claim 1, wherein the screw thread has a profile which is matched to the balls, wherein the screw thread comprises a semi-circular profile substantially corresponding to an outer surface profile of the balls, and wherein the spacing between adjacent threads of the screw shaft in the ball-passage corresponds substantially to the diameter of the balls.

6. A screw pump as claimed in claim 1, wherein the balls comprise a material that is able to shear or fracture in the event of a jam with the screw shaft.

7. A screw pump as claimed in claim 1, wherein the body is a multipart body, and the ball-passage is provided, in part, by two tracks, each formed in opposing faces in respective parts of the multipart body.

8. A screw pump as claimed in claim 1, wherein the ball-passage and the plurality of balls contained therein form a part of a ball-loop, and wherein the screw pump comprises a plurality of ball-loops.

9. A liquid recirculation system as claimed in claim 1, wherein
the one-way drive mechanism comprises a one-way clutch.

10. An actuator comprising a recirculation system as claimed in claim 1, wherein the actuator is a trimmable horizontal stabilisation actuator (THSA), and wherein the gallery is arranged to lubricate or cool moving parts of the actuator.

* * * * *